United States Patent [19]

Kimura et al.

[11] Patent Number: 4,886,961

[45] Date of Patent: Dec. 12, 1989

[54] LIGHT DETECTOR HAVING LIGHT SENSOR AND LIGHT INDICATOR, AND CONTROL CIRCUIT THEREOF

[75] Inventors: Mitsutoshi Kimura; Masaharu Baba, both of Yokohama, Japan

[73] Assignee: Kabushiki Kaisha Toshiba, Kawasaki, Japan

[21] Appl. No.: 207,658

[22] Filed: Jun. 16, 1988

[30] Foreign Application Priority Data

Jun. 17, 1987 [JP] Japan .................................. 62-150479
Jan. 5, 1988 [JP] Japan .................................. 63-207[U]

[51] Int. Cl.[4] .............................................. G01J 1/32
[52] U.S. Cl. ..................................... 250/205; 356/224
[58] Field of Search ........ 250/205, 208, 209, 214 AL, 250/214 B, 214 R, 214 RC, 557; 356/222, 224; 354/403; 358/161; 361/139; 307/311; 340/527, 528, 565, 567

[56] References Cited

U.S. PATENT DOCUMENTS

| | | |
|---|---|---|
| 3,946,241 | 3/1976 | Malinowski .......................... 250/574 |
| 4,320,289 | 3/1982 | White et al. ...................... 250/214 R |
| 4,346,331 | 8/1982 | Hoge .............................. 250/214 AL |
| 4,443,057 | 4/1984 | Bauer et al. ...................... 250/214 B |
| 4,514,727 | 4/1985 | Van Antwerp ...................... 358/161 |
| 4,645,919 | 2/1987 | McCaleb ........................ 250/214 RC |
| 4,681,432 | 7/1987 | Kawabata et al. .................. 354/403 |

Primary Examiner—David C. Nelms
Assistant Examiner—William L. Oen
Attorney, Agent, or Firm—Oblon, Spivak, McClelland, Maier & Neustadt

[57] ABSTRACT

A light detector which indicates decrease in the level of ambient light below a prescribed value. The light detector includes a light indicator for radiating light when the level of ambient light decreases below the prescribed value, a light sensor arranged parallel to the light indicator for receiving actual light including ambient light and light from the light indicator for outputting a detection signal corresponding to a level of actual light, and a control circuit for evading effect of the light from the light indicator for controlling the operation of the light indicator while ambient light is below the prescribed level even though the actual light received by the light sensor increases above the prescribed level.

17 Claims, 6 Drawing Sheets

LIGHT DETECTOR HAVING LIGHT SENSOR AND LIGHT INDICATOR, AND CONTROL CIRCUIT THEREOF

BACKGROUND OF THE INVENTION

1. Field of the Invention

This invention relates, in general, to light detectors which detect ambient light and inform a user that the level of a detected ambient light is below a prescribed value. The user may carry out a suitable operation in response to the information from the light detector.

2. Description of Related Art

A light detector may be applied to an automobile. An automobile accident, such as, e.g., collision between automobiles, may occur in the dusk of the evening. This is because it is rather difficult to realize the location of an automobile in such twilight when lamps of the automobile, e.g., headlamp, sidemarker lamp, tail lamp, etc., are not operated. The timing at which the driver turns on the lamp depends on the experimental perception of each driver. Therefore, the timing at which the lamps of an automobile are turned on is different from one to another.

Accordingly, compact and efficient light detectors are needed to inform the driver of the time at which the lamps should be turned on. A conventional light detector includes a light sensor for detecting ambient light, and a light indicator for indicating when a lamp should be turned on. The light sensor and the light indicator are separately arranged with respect to each other to prevent the light sensor from detecting the light from the light indicator when the light indicator is operated. In the above-described conventional light detector, it is difficult to integrally arrange the light indicator and the light sensor on a common base.

The inventors of the present invention attempted to assemble a light indicator and a light sensor on a common base. Firstly, the inventors tried to arrange the light indicator and the light sensor on the same surface of the common base. In this arrangement, light from the light indicator interfered with the operation of the light sensor. The light indicator operates when ambient light detected by the light sensor is below a prescribed level. However, at this moment, the light sensor detects light from the light indicator rather than ambient light, and the light indicator stops its operation immediately after the light sensor detects light from the light indicator. Therefore, the inventors could not visibly observe the operation of the light indicator, because the indicator was on for such a short period. The effect of the light from the light indicator can be avoided if a relatively large isolation wall is arranged between the light indicator and the light sensor. However, the external shape of the light detector becomes relatively large. The inventors also tried to arrange the light indicator and the light sensor on opposite surfaces of the common base. This arrangement could isolate the light sensor from light radiated from the light indicator. However, the external shape of the light detector could not be minimized to a desirable shape.

SUMMARY OF THE INVENTION

Accordingly, it is an object of the invention to minimize the external size of a light detector.

It is another object of the invention to provide a control device for controlling the operation of a light detector.

To accomplish the above objects, a light detector includes a light indicator for radiating light when ambient light is below a prescribed level, the light sensor for receiving actual light including ambient light and light from the light indicator for outputting a detection signal corresponding to a level of the actual light, a control circuit for evading effect of the light from the light indicator for controlling the light indicator while ambient light is below the prescribed level even though the actual light received by the light sensor increases above the prescribed level when the light indicator radiates light.

The light detector may be arranged parallel to the light indicator for receiving light from the light indicator. The control circuit may include delay circuit for delaying the detection signal from the light sensor for flashing the light indicator at a prescribed interval.

BRIEF DESCRIPTION OF THE DRAWINGS

These and other objects and advantages of this invention will become apparent from the following detailed description of the presently preferred embodiment of the invention, taken in conjunction with the accompanying drawings of which.

DETAILED DESCRIPTION OF THE PREFERRED EMBODIMENTS

Figure 1:
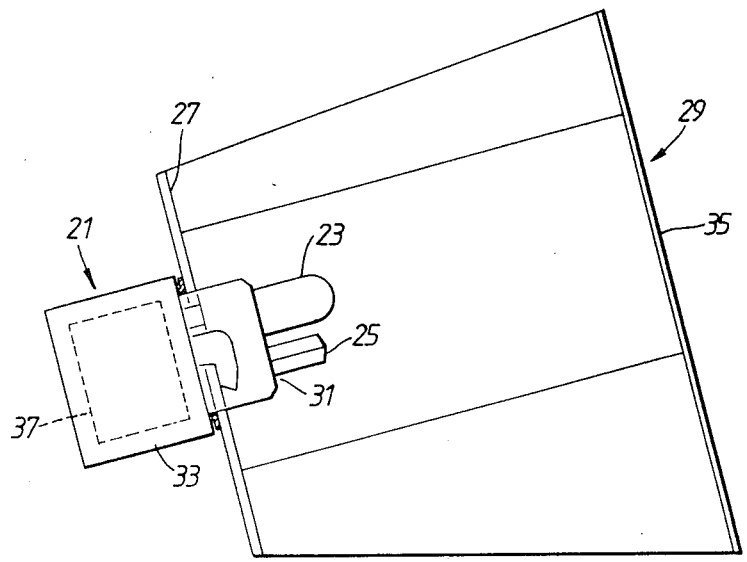
FIG. 1 is a schematic view illustrating a first embodiment of a light detector of the present invention mounted on a back panel of a dashboard of an automobile.

The preferred embodiments of the present invention which are applied to an automobile will now be described in more detail with reference to the accompanying drawings. A light detector 21, including a lamp 23 (light indicator) and a photo-sensor 25 (light sensor), is mounted on a back panel 27 of a dashboard 29 of an automobile. Lamp 23 and photo-sensor 25 are mounted parallel to one the other on a front surface 31 of a housing 33 such that they are oriented toward a front panel 35 of dashboard 29. A control circuit 37 shown in FIG. 3 is arranged in housing 33.

Figure 2:
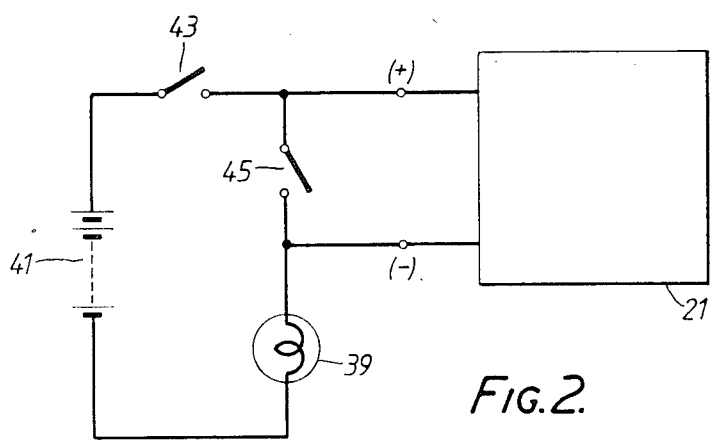
FIG. 2 is a view illustrating a circuitry arrangement in which a light detector of the first embodiment shown in FIG. 1 is applied.

As shown in FIG. 2, a lamp 39, such as, e.g., headlamp, sidemarker lamp, tail lamp, etc., is connected to a battery 41 of an automobile through a power switch 43 and an operation switch 45. Light detector 21 is connected in parallel with operation switch 45. If operation switch 45 is opened, light detector 21 operates when power switch 43 is closed.

Figure 3:
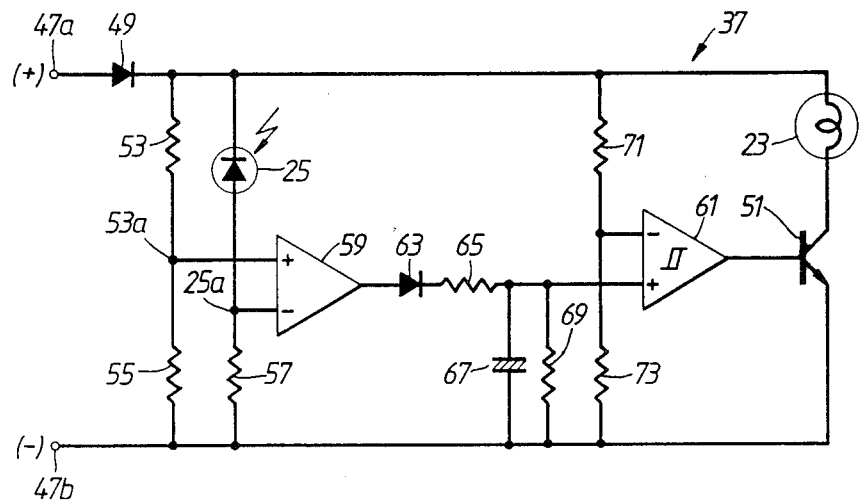
FIG. 3 is a view illustrating a circuitry arrangement used for controlling the light detector shown in FIG. 1.

In FIG. 3, lamp 23 of light detector 21 is connected between a positive terminal 47a and a negative terminal 47b through a diode 49 and an NPN transistor 51. One end of a resistor 53 is connected to positive terminal 47a through diode 49, and the other end of resistor 53 is connected to negative terminal 47b through a resistor 55. A cathode of photo-sensor 25 (photo-diode) is connected to positive terminal 47a through diode 49. An anode of photo-sensor 25 is connected to negative terminal 47b through a resistor 57.

A connecting point 53a between resistors 53 and 55 is connected to the non-inverting input terminal (+) of a comparator 59. The inverting input terminal (−) of comparator 59 is connected to a connecting point 25a between photo-sensor 25 and resistor 57. An output terminal of comparator 59 is connected to the non-inverting input terminal (+) of a comparator 61 through a diode 63 and a resistor 65. A condenser 67 is connected between the non-inverting input terminal (+) of comparator 61 and negative terminal 47b. A resistor 69 is connected in parallel with condenser 67. The inverting input terminal (−) of comparator 61 is connected to positive terminal 47a through a resistor 71, and is also connected to negative terminal 47b through a resistor 73. The output terminal of comparator 61 is connected to a base of transistor 51. Comparator 61 has a hysteresis characteristic in which a first level and a second level smaller than first level are set. First and second levels are determined in accordance with an input level to the inverting input terminal (−) of comparator 61. Comparator 61 outputs a high level signal when an input level to the non-inverting input terminal (+) of comparator 61 reaches first level. Comparator 61 maintains the high level signal while the input level to the non-inverting input terminal (+) of comparator 61 is between the first and second levels. The output of comparator 61 is inverted to a low level when the input level to the non-inverting input terminal (+) of comparator 61 decreases to the second level.

The operation of the above-described embodiment will now be described hereafter. As stated before, in FIG. 2, when operation switch 45 is opened and power switch 43 is closed, a DC voltage of battery 41 is applied to light detector 21, and therefore, light detector 21 is ready to operate. Otherwise, when operation switch 45 is closed, the operation of light detector 21 is inhibited.

In FIG. 3, when operation switch 45 is opened and power switch 43 is closed, a high level voltage greater than the input voltage to the non-inverting input terminal (+) of comparator 59 is applied to the inverting input terminal (−) of comparator 59 through photo-sensor 25 if the ambient light detected by photo-sensor 25 is above a prescribed level (daytime). Comparator 59 outputs a low level signal. Comparator 61 also outputs a low level signal. Therefore, transistor 51 maintains an OFF-state, and lamp 23 is not operated.

Figure 4:
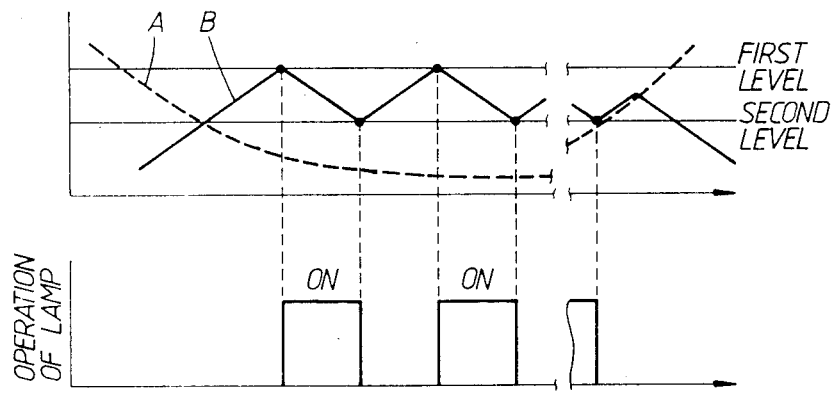
FIG. 4 is a timing chart illustrating the operation of the circuitry arrangement shown in FIG. 3.

As can be understood from FIG. 3, if ambient light detected by photo-sensor 25 decreases below the predetermined level, as indicated by a dotted line (A) in FIG. 4, comparator 59 is inverted into a high level signal output state, and condenser 67 begins charging. When an output of an integration circuit composed of condenser 67 and resistor 65 becomes the first level, as indicated by a solid line (B) in FIG. 4, comparator 61 outputs the high level signal. Therefore, transistor 51 is turned on, and lamp 23 is operated (ON). At this time, photo-sensor 25 detects light from lamp 23, and thus, comparator 59 is reinverted into the low level signal output state. The charge on condenser 67 is discharged through resistor 69, as shown in FIG. 4. When the charge on condenser 67 decreases to the second level, in other words, when the input level to the non-inverting input terminal (+) of comparator 61 reaches the second level, comparator 61 is re-inverted into the low level signal output state. Therefore, transistor 51 is turned off, and thus, lamp 23 is extinguished. At this time, since photo-sensor 25 detects extinction of lamp 23, the input level to the inverting input terminal (−) of comparator 59 decreases, and comparator 59 is inverted into the high level signal output state. Condenser 67 is charged, and thus, the input level to the non-inverting input terminal (+) of comparator 61 increases. When the input level to the non-inverting input terminal (+) of comparator 61 reaches the first level, comparator 61 is inverted into the high level signal output state. Thus, lamp 23 is operated through transistor 51, as stated before. The above-described operation is repeatedly carried out until the user turns off switch 45 shown in FIG. 2.

As can be understood from the above description, since the output level of the integration circuit including condenser 67 and resistor 65 varies in response to existence of light from lamp 23 detected by photo-sensor 25, lamp 23 flashes at a prescribed interval by the hysteresis characteristic of comparator 61. Upon flashing of lamp 23, the user is aware that ambient light decreases below the prescribed level. The user closes switch 45 to activate lamp 39, shown in FIG. 2. Lamp 23 of light detector 21 is extinguished immediately after switch 45 is closed, and the operation of light detector 21 is inhibited thereafter.

In the above described embodiment, since lamp 23 and photo-sensor 25 are mounted substantially parallel to one another on one surface of common base 31 and control circuit 37 is arranged in housing 33, the external size of light detector 21 may be minimized. Furthermore, since changes of the light from lamp 23 detected by photo-sensor 25 are delayed by the integration circuit including condenser 67 and resistor 69, comparator 61, and transistor 51, lamp 23 flashes at a prescribed interval. Therefore, light detector 21 may operate normally even though photo-sensor 25 is exposed to light from lamp 23.

A second embodiment of the present invention will now be described with reference to FIG. 5. One of the terminals of lamp 23 is connected to positive terminal 47a through diode 49, and the other terminal of lamp 23 is connected to negative terminal 47b through NPN transistor 51. One end of resistor 91 is connected to positive terminal 47a through diode 49. The other end of resistor 91 is connected to negative terminal 47b through resistor 93 and condenser 95. The cathode of photo-diode 25 (photo-sensor) is connected to a connecting point 91a between resistors 91 and 93. The anode of photo-diode 25 is connected to negative terminal 47b through a resistor 97. The cathode of a zener diode 99 is connected to the connecting point 91a, and the anode thereof is connected to negative terminal 47b. A condenser 101 is connected in parallel with zener diode 99. The cathode of a diode 103 is connected to the anode of photo-diode 25, and the anode of diode 103 is connected to a connecting point 93a between resistor 93 and condenser 95. An inverting input terminal (−) of a comparator 105 is connected to the connecting point 93a. A non-inverting input terminal (+) of comparator 105 is connected to negative terminal 47b through a resistor 107. The non-inverting input terminal (+) of comparator 105 also is connected to a square wave generating circuit 109 through a resistor 111.

The operation of the above-described control circuit will be described hereafter. When the level of the ambient light is above a prescribed value, the resistance of photo-sensor 25 exposed to the ambient light is small. The potential on the cathode of diode 25 is high, and therefore, the input level to the inverting input terminal (−) of comparator 105 also is high. Comparator 105 maintains the low level signal output state even though square waves generated from square wave generating circuit 109 are supplied to the non-inverting input terminal (+) of comparator 105. Transistor 51 remains in the off state, and thus, lamp 42 is not operated.

Figure 5:
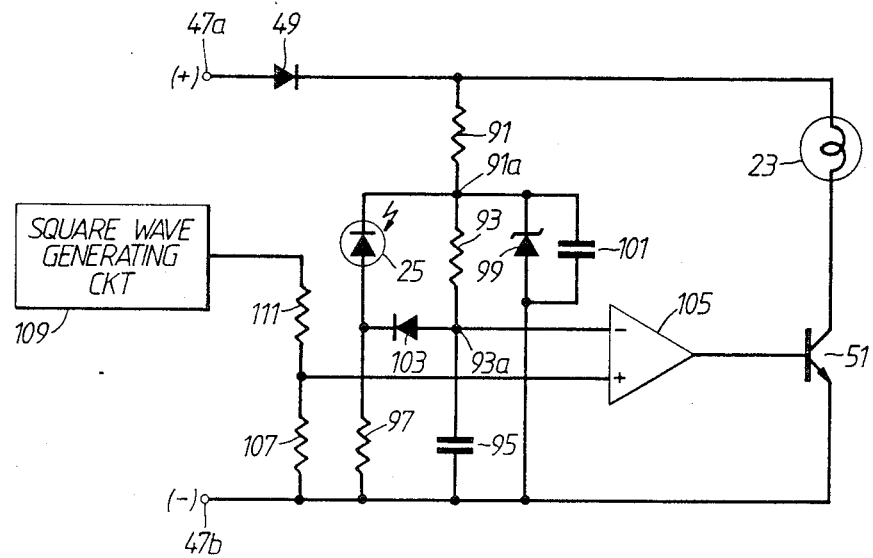
FIG. 5 is a view illustrating a circuitry arrangement of a second embodiment of the present invention.

As can be understood from FIG. 5, when the environment becomes dark, the resistance of photo-sensor 25 gradually decreases. Therefore, the input level to the inverting input terminal (−) of comparator 105 also decreases. Comparator 105 is finally turned to the high level signal output state when the input level to the inverting input terminal (−) of comparator 105 decreases below a high level of the square waves which are supplied to non-inverting input terminal (+) of comparator 105 from square wave generating circuit 109. After that, the output state of comparator 105 is periodically turned from the high level output state to the low level output state and vice versa in synchronism with the cycle of the square waves from square wave generating circuit 109 while the input level to the inverting input terminal (−) of comparator 105 is between high and low levels of the square waves. As stated above, transistor 51 is periodically turned on in response to the output state of comparator 105, resulting in the flashing of lamp 23. When lamp 23 flashes, the user may realize that an ambient light is below a prescribed level. Thus, the user carries out a suitable operation.

At this time, since lamp 23 and photo-sensor 25 are arranged parallel to one another on common base 31, as shown in FIG. 1, photo-sensor 25 detects the light from lamp 23 and decreases the resistance thereof when lamp 23 is turned on. However, since lamp 23 is on for a short period of time, condenser 95 prevents the input level to the inverting input terminal (−) of comparator 105 from being greatly decreased. The input level to the inverting input terminal of comparator 105 produced when the output of photo-sensor 25 once decreases below the prescribed level is maintained at a prescribed value by condenser 95. Lamp 23 flashes in response to the square wave signal from square wave generating circuit 109. Therefore, similar effects to the one embodiment may be achieved in the second embodiment described above.

Figure 6:
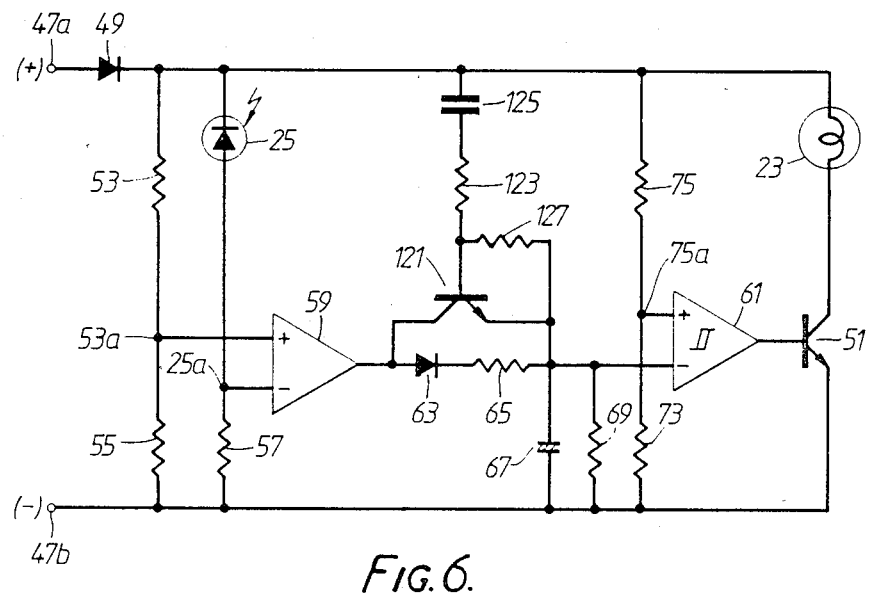
FIG. 6 is a view illustrating a circuitry arrangement of a third embodiment of the present invention.

A third embodiment of the present invention will now be described with reference to FIG. 6. Lamp 23 of light detector 21 is connected between positive terminal 47a and negative terminal 47b through diode 49 and NPN transistor 51. A serial circuit (voltage dividing circuit) of resistors 53 and 55 is connected between positive and negative terminals 47a and 47b through diode 49. A cathode of photo-sensor 25 is connected to positive terminal 47a through diode 49. An anode of photo-sensor 25 is connected to negative terminal 47b through resistor 57. A connecting point 53a between resistors 53 and 55 is connected to the non-inverting input terminal (+) of comparator 59. A connecting point 25a between photo-sensor 25 and resistor 57 is connected to the inverting input terminal (−) of comparator 59. The output terminal of comparator 59 is connected to the non-inverting input terminal (+) of comparator 61 through a diode 63 and a resistor 65. A condenser 67 is connected to a connecting point 65a between resistor 65 and the non-inverting input terminal of comparator 61. Resistor 65 and condenser 67 constitute an integration circuit. A resistor 69 is connected in parallel with condenser 67. The electric charge on condenser 67 discharges through resistor 69. One end of resistor 75 is connected to positive terminal 47a through diode 49, and the other end of resistor 75 is connected to negative terminal 47b through resistor 73. A connecting point 75a between resistors 75 and 73 is connected to the inverting input terminal (−) of comparator 61. The output terminal of comparator 61 is connected to the base of NPN transistor 51. Comparator 61 has a hysteresis characteristic similar to the first embodiment described before. As shown in FIG. 6, the collector of an NPN transistor 121 is connected to the output terminal of comparator 59, and the emitter thereof is connected to connecting point 65a between resistor 65 and condenser 67. The base of transistor 121 is connected to positive terminal 47a through a resistor 123, a condenser 125 and diode 49, and is also connected to the emitter thereof through a resistor 127.

The operation of the above-described embodiment will now be described hereafter. As stated before, when a user closes switch 43, the DC voltage from battery 41 is applied to light detector 21, and therefore, light detector 21 is ready to operate. However, if switch 45 is already closed, the operation of light detector 21 is inhibited.

In FIG. 6, switch 45 shown in FIG. 2 has been opened and when the user closes switch 43, condenser 67 is rapidly charged through condenser 125, resistor 123 and transistor 121. When charges on condenser 67 reach the first level of comparator 61, comparator 61 outputs a high level signal, and lamp 23 is operated through transistor 51 irrespective of the level of an ambient light. Transistor 121 is turned off when condenser 125 charges at a prescribed level, the charges on condenser 67 discharge through resistor 69. In other words, the input level to the non-inverting input terminal (+) of comparator 61 decreases. When the input level to the non-inverting input terminal (+) of comparator 61 decreases to the second level, comparator 61 is inverted into a low level signal output state. Therefore, transistor 51 is turned off, and lamp 23 is extinguished. Other operations of this embodiment is similar to the first embodiment, and therefore, the description of the operation thereof is not repeated.

With the above-described third embodiment, lamp 23 of indicator 21 is operated for a short period irrespective of the level of ambient light detected by photo-sensor 25 when switch 43 is closed. The user may confirm whether lamp 23 of indicator 21 is usable or not every time when switch 43, shown in FIG. 2, is closed to operate light detector 21.

Figure 7:
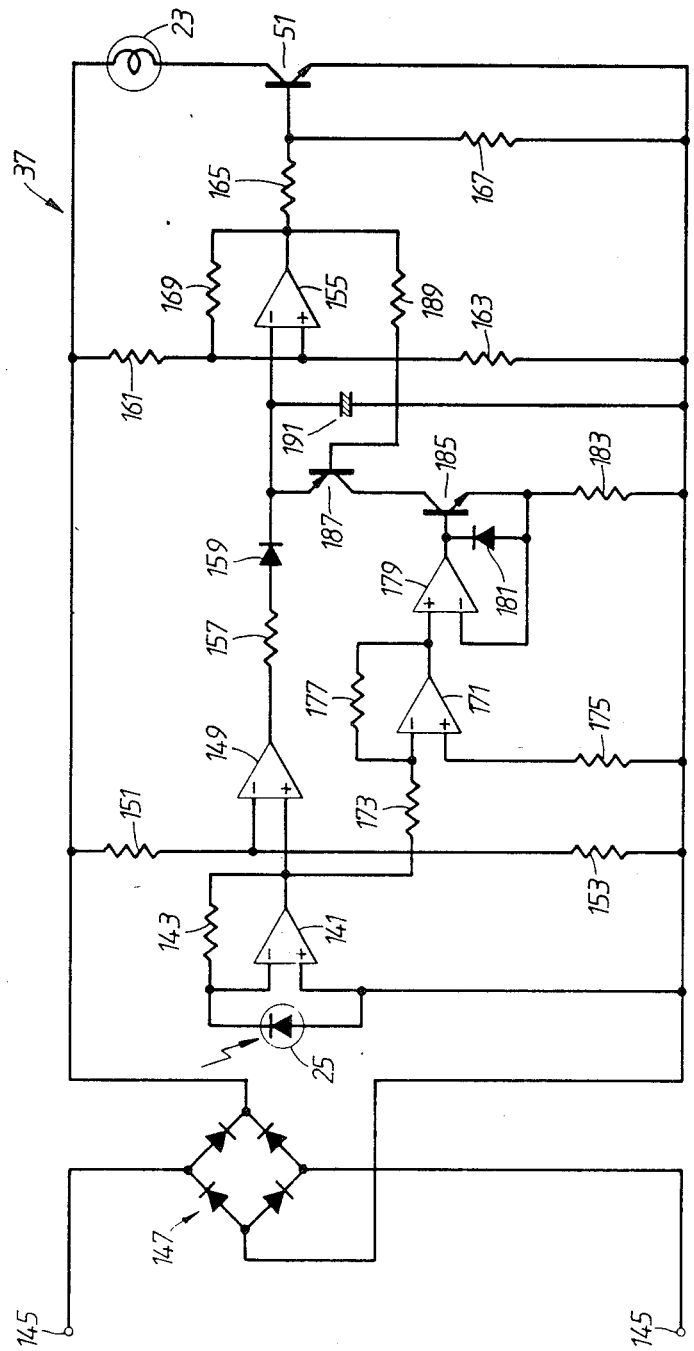
FIG. 7 is a view illustrating a circuitry arrangement of a fourth embodiment of the present invention.
Figure 8:
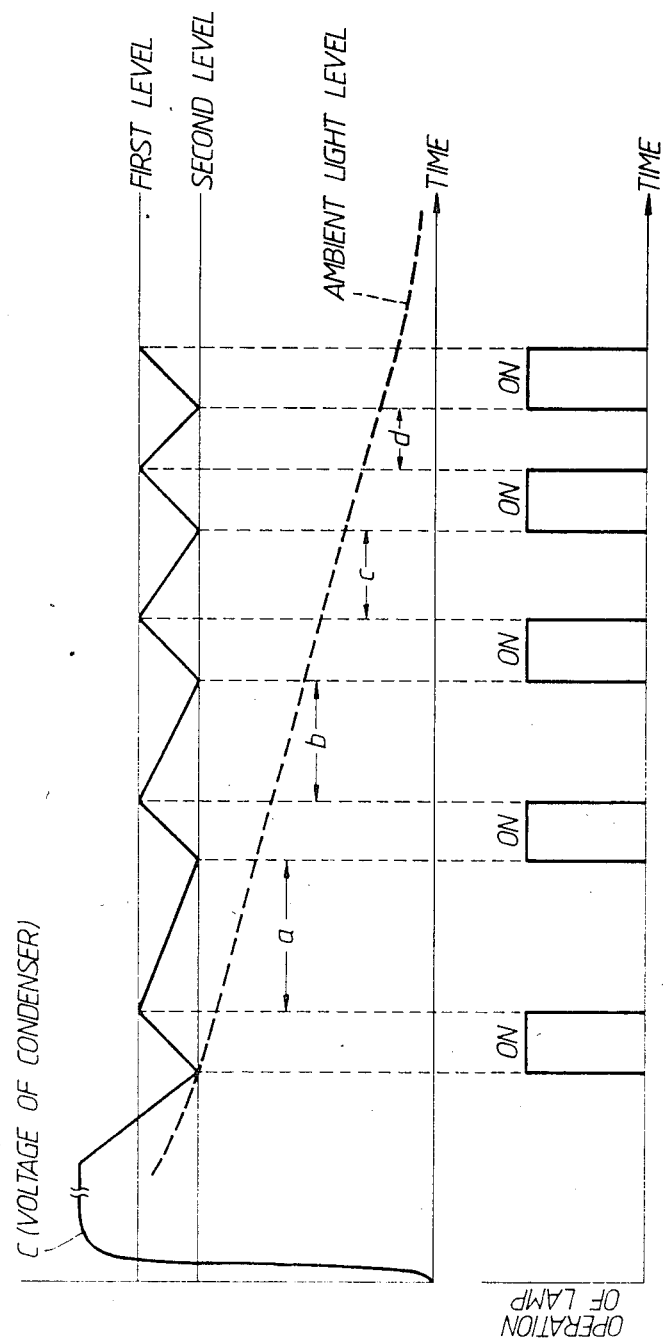
FIG. 8 is a timing chart illustrating the operation of the circuitry arrangement shown in FIG. 7.
Figure 9:
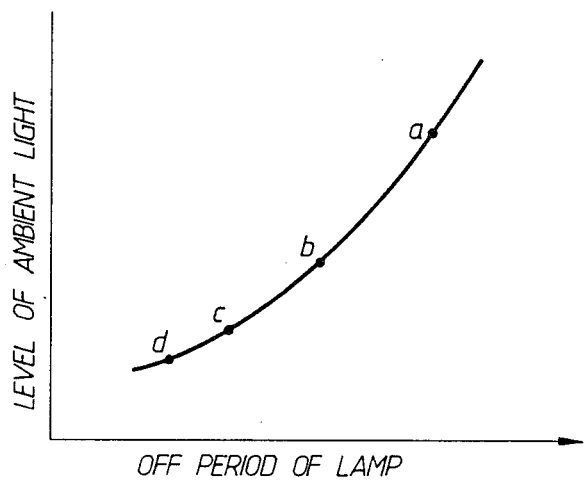
FIG. 9 is a graph illustrating variation of flashing interval of a light indicator when the level of ambient light detected by a light sensor varies in fourth embodiment.

A fourth embodiment of the present invention will now be described hereafter with reference to FIGS. 7, 8 and 9. As shown in FIG. 7, The cathode of photodiode 25 (photo-sensor) is connected to the inverting input terminal (−) of an operational amplifier 141, and is also connected to the output terminal of operational amplifier 141 through a resistor 143. The anode of photo-diode 25 is connected to the non-inverting input terminal (+) of operational amplifier 141, and is also connected to a DC input terminal 145 through a full-wave rectifying circuit 147. The output current of photo-diode 25 is converted to a voltage through operational amplifier 141. The output terminal of operational amplifier 141 is connected to the non-inverting input terminal (+) of a comparator 149. The inverting input terminal (−) of comparator 149 is connected to one of the output terminals of full-wave rectifying circuit 147 through a resistor 151, and is also connected to the other output terminal of rectifying circuit 147 through a resistor 153. The output terminal of comparator 149 is connected to the inverting input terminal (−) of a comparator 155 through a resistor 157 and a diode 159. The non-inverting input terminal (+) of comparator 155 is connected to one of the output terminals of full-wave rectifying circuit 147 through a resistor 161, and is also connected to the other output terminal of full-wave rectifying circuit 147 through a resistor 163. The output terminal of comparator 155 is connected to the base of transistor 51 through a resistor 165. The base of transistor 51 is connected to the other output terminal of full-wave rectifying circuit 147 through a resistor 167. The output terminal of comparator 155 is connected to the non-inverting input terminal (+) thereof through a resistor 169. The collector of transistor 51 is connected to one of the output terminals of full-wave rectifying circuit 147 through lamp 23 (light indicator). The emitter of transistor 51 is connected to the other output terminal of full-wave rectifying circuit 147.

The output terminal of operational amplifier 141 is connected to the inverting input terminal (−) of an operational amplifier 171 through a resistor 173. The non-inverting input terminal (+) of amplifier 171 is connected to the other output terminal of full-wave rectifying circuit 147 through a resistor 175. The output terminal of amplifier 171 is connected to the inverting input terminal (−) thereof through a resistor 177. The output terminal of amplifier 171 is also connected to the non-inverting input terminal (+) of an operational amplifier 179. The inverting input terminal (−) of amplifier 179 is connected to the output terminal thereof through a diode 181, and is connected to the other output terminal of full-wave rectifying circuit 147 through a resistor 183. The output terminal of operational amplifier 179 is connected to the base of an NPN transistor 185. The emitter of transistor 185 is connected to resistor 183. The collector of transistor 185 is connected to the collector of a PNP transistor 187. The emitter of transistor 187 is connected to the inverting input terminal (−) of comparator 155, and the base thereof is connected to the output terminal of comparator 155 through a resistor 189. One of the ends of a condenser 191 is connected to the emitter of transistor 187, and the other end thereof is connected to the other output terminal of full-wave rectifying circuit 147.

The operation of the above-described embodiment will now be described. In FIG. 7, when the level of ambient light detected by photo-diode 25 is above a prescribed value, comparator 149 is a high level signal output state. Otherwise, comparator 149 is a low level signal output state. Likewise, when the level of ambient light detected by photo-diode 25 is a high level, the output current of operational amplifier 179 is small. If the level of ambient light decreases, the output current of operational amplifier 179 increases. Therefore, if the level of ambient light detected by photo-diode 25 is a high level, comparator 149 is the high level signal output state, and condenser 191 is rapidly charged through resistor 157, as indicated by a solid line C in FIG. 8. When the voltage of condenser 191 increases to a first level set in comparator 155 (described in one embodiment), comparator 155 become a low level signal output state. Transistor 51 is off-state, and lamp 23 is not operated. At this time, since comparator 155 is the low level signal output state, transistor 187 is on-state. However, since the output current of operational amplifier 179 is small, as stated above, and transistor 185 is off-state, charges on condenser 191 are maintained. On the other hand, comparator 149 becomes a low level signal output state when the level of ambient light decreases below a prescribed value. At this moment, since the output of operational amplifier 141 is small, the output current of operational amplifier 179 is large, and transistor 185 is turned on. Therefore, charges on condenser 191 discharge through transistors 187 and 185 and resistor 183. The discharge current from condenser 191 is inversely proportional to the level of ambient light. If the ambient light is a low level, the discharge current from condenser 191 is small. Otherwise, the discharge current from condenser 191 is large. As stated above, when the voltage of condenser 191 decreases to the second level, comparator 155 is the high level signal output state, and lamp 23 is operated through transistor 51, as shown in FIG. 8. At this time, since comparator 155 is the high level signal output state, transistor 187 is turned off, and thus, the discharge current from condenser 191 is stopped. At the same time, comparator 149 becomes the high level signal output state, and condenser 191 begins re-charging, as shown in FIG. 8. When the voltage of condenser 191 reaches the first level, comparator 155 is the low level signal output state, and lamp 23 is extinguished. After that, charges on condenser 191 discharge through transistors 187 and 185 and resistor 183, as shown in FIG. 7. This operation is repeatedly carried out, and thus, lamp 23 flashes. As stated above, since the discharge current from condenser 191 varies in response to the level of ambient light, a discharge period (off period of lamp 23) that the voltage of condenser 191 reaches from the first level to the second level is also changed. The discharge period (off period of lamp 23) decreases, as the level of ambient light decreases, as shown in FIG. 9. Therefore, flashing of lamp 23 varies, as the level of ambient light decreases, as shown in FIG. 8.

With the above-described embodiment, since flashing of lamp 23 becomes fast, as the level of ambient light decreases, warning against the user may be emphasized, as the level of ambient light decreases. Furthermore, in the above-described embodiment, DC power from battery 41 shown in FIG. 2 is supplied to control circuit 37 through full-wave rectifying circuit 147. Control circuit 37 may be connected to battery 41 irrespective of its polarity when assembling.

Figure 10:
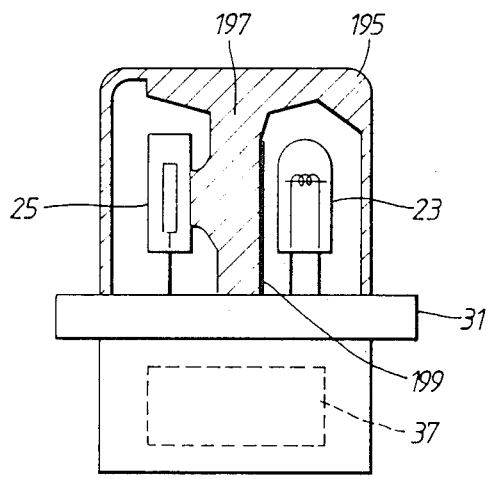
FIG. 10 is a partial cross sectional view illustrating a fifth embodiment of the present invention.

As shown in FIG. 10, light indicator 23 and photo-sensor 25 may be covered with a light permeable cap 195. A separation wall 197 may extend from the upper surface of cap 195, and may be disposed between light indicator 23 and photo-sensor 25. A part of separation wall opposite to photo-sensor 25 may project toward photo-sensor 25, and may be in contact with the light receiving surface of photo-sensor 25 to lead ambient light to photo-sensor 25. A heat shield plate 199 may be attached to a surface of separation wall 197 opposite to light indicator 23 to interrupt heat radiated from light indicator 23 when light indicator 23 operates.

According to the above-described embodiments, since a photo-sensor and a light indicator (lamp) are arranged parallel to one the other, the external size of the light detector including the photo-sensor, the light indicator and the control circuit can be minimized. Since changes of the light from the light indicator detected by the photo-sensor is delayed by an integration circuit including a condenser and a resistor, and a comparator, the light indicator can flash at a prescribed interval in spite of the photo-sensor exposed to light from the light indicator.

The present invention has been described with respect to specific embodiments. However, other embodiments based on the principles of the present invention should occur to those of ordinary skill in the art. Such embodiments are intended to be covered by the claims.

What is claimed is:

1. A light detector comprising:
   light indicator means for radiating light, the light indicator means initiating radiation of light therefrom when ambient light is below a prescribed level;
   light sensor means for receiving actual light including ambient light and the light from the light indicator means for outputting a detection signal corresponding to a level of the actual light, the light indicator responding to the light sensor; and
   control circuit means for evading effect of the light from the light indicator means for controlling the light indicator means while ambient light is below the prescribed level even though the actual light received by the light sensor increases above the prescribed level by the radiation of light from the light indicator means.

2. A light detector according to claim 1, wherein control circuit means includes means for overriding the detection signal from the light sensor means for a predetermined time for controlling the operation of the light indicator means.

3. A light detector according to claim 2, wherein the overriding means includes delay means for delaying the detection signal from the light sensor means for a prescribed time for flashing the light indicator means at a prescribed interval.

4. A light detector according to claim 3, wherein the delay means includes an integration circuit and a comparator, the integration circuit having a resistor and a condenser, the comparator having a hysteresis characteristic.

5. A light detector according to claim 3, wherein the control circuit means further includes check means for operating the light indicator means for a prescribed period irrespective of the level of ambient light received by the light sensor means when the light sensor means is operated.

6. A light detector according to claim 3, wherein the control circuit means includes means for varying the interval of flashing of the light indicator means in response to changes in the level of the ambient light.

7. A light detector according to claim 1, wherein control means includes a full wave rectifying circuit.

8. A light detector according to claim 1, wherein the control circuit means includes square wave generating means for generating square wave signals, the light indicator means initiating the radiation of light in response to the light sensor means, and flashing in response to the square wave signals from the square wave generating means irrespective of the detection signal from the light sensor means after initiating the radiation of light.

9. A light detector according to claim 1 further including light permeable cap means for covering the light indicator means and light sensor means.

10. A light detector according to claim 9, wherein the light permeable cap means includes a bottom wall having an outer edge, and an outer wall substantially perpendicularly extending from the outer edge of the bottom wall for defining an element receptacle therein.

11. A light detector according to claim 10, wherein the light detector means is a photo-diode, and the light indicator means is a lamp; the cap means further including a partition wall extending from the bottom wall substantially in parallel with the outer wall for partitioning the element receptacle into a first cell wherein the lamp is disposed, and a second call wherein the photo-diode is disposed.

12. A light detector according to claim 11, wherein the cap means includes a heat shield plate attached to the partition wall exposed to the first cell for protecting the photo-diode against the lamp.

13. A light detector comprising:
   a base;
   a light indicator arranged on the base for radiating light;
   a light sensor disposed on the base substantially in parallel to the light indicator for receiving actual light including ambient light and light from the light indicator for detecting the level of the actual light; and
   a control circuit arranged in the base for controlling the operation of the light indicator in response to the light sensor.

14. A light detector according to claim 13, wherein the light indicator is a lamp radiating heat, the base including a separation wall substantially perpendicularly extending from the base between the light indicator and the light sensor for protecting the light sensor against the heat from the light indicator.

15. A light detector according to claim 14, wherein the separation wall has a top portion, the base further including a light permeable roof plate extending substantially at light angles from the top portion of the separation wall for covering the light indicator and the light sensor in the extending direction.

16. A system for a light detector having a light indicator for radiating light, and a light sensor disposed substantially parallel to the light indicator for receiving an actual light including ambient light and light from the light indicator for detecting a level of the actual light, comprising:
   an object to be identified;
   DC power source for supplying DC power to the light detector;
   power switch means for selectively connecting the DC power source with the light detector;
   operation switch means connected in parallel with the light detector, the operation switch being connected to the DC power source through the power switch, the light detector being activated when the operation switch means is opened, the operation switch being closed when the light indicator radiates light therefrom; and a visible location indicator attached to the object for indicating the location of the object, the location indicator being activated when the operation switch is closed.

17. A system according to claim 15, wherein the power switch means further includes check means for operating the light indicator for a predetermined period irrespective of the level of ambient light received by the light sensor when the power switch is closed.

* * * * *